No. 880,807. PATENTED MAR. 3, 1908.
E. F. MENKIN.
PICKLE FORK.
APPLICATION FILED SEPT. 9, 1907.
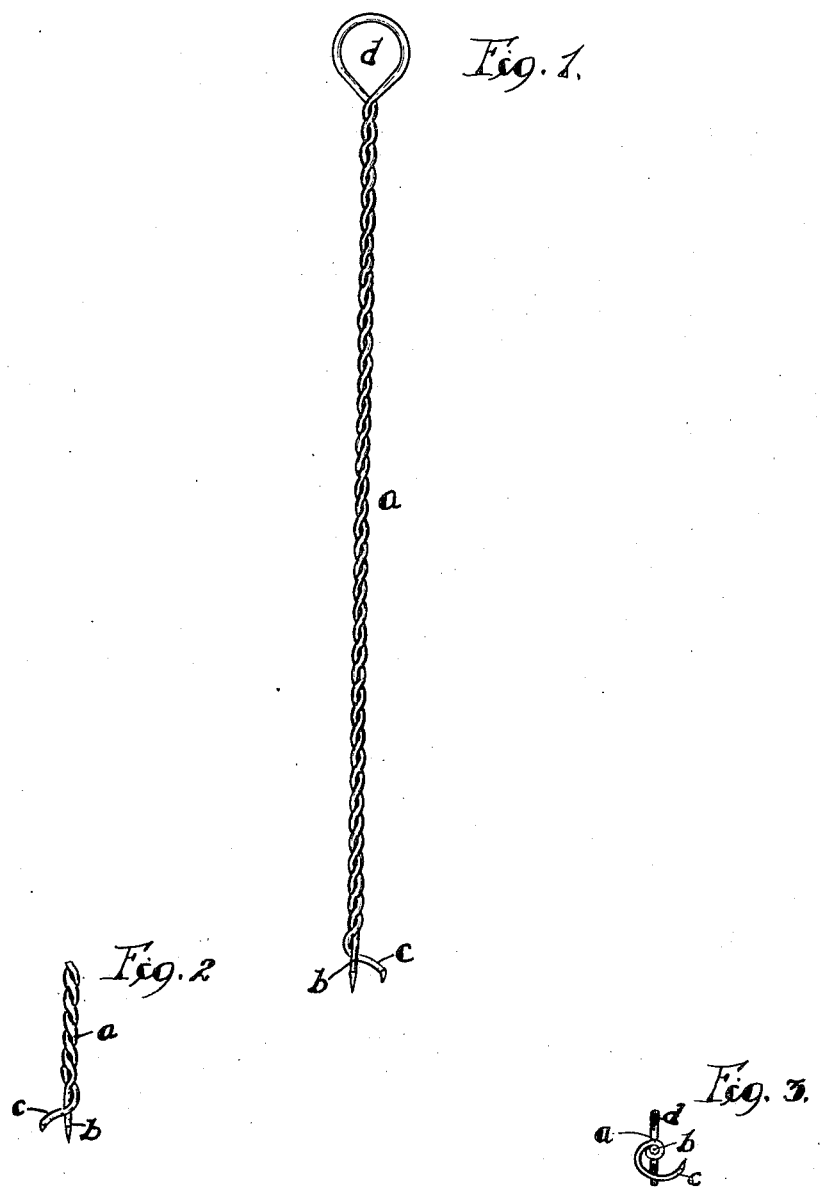
Witnesses:
Wm P. Bond
Oscar W. Bond
Inventor
Edward F. Menkin

UNITED STATES PATENT OFFICE.

EDWARD F. MENKIN, OF CHICAGO, ILLINOIS, ASSIGNOR, BY MESNE ASSIGNMENTS, TO ENTERPRISE SPECIALTY COMPANY, A CORPORATION OF ILLINOIS.

PICKLE-FORK.

No. 880,807.      Specification of Letters Patent.      Patented March 3, 1908.

Application filed September 9, 1907. Serial No. 391,987.

*To all whom it may concern:*

Be it known that I, EDWARD F. MENKIN, a citizen of the United States, and residing at Chicago, in the county of Cook and State of Illinois, have invented a certain new and useful Improvement in Pickle-Forks, of which the following is a specification.

The removal of pickles, olives, and other like articles from bottles and like receptacles, one at a time, is attended with more or less inconvenience and trouble; and the present invention relates to forks specially adapted and intended for the use in removing pickles and other articles one at a time from the bottle or other receptacle, and this without waste of time and without any great difficulty in so doing. Under the term "pickle" is included articles put up in bottles or jars.

The objects of the invention are to construct a pickle fork having a stem and an acting end, with the acting end provided with a spear point and a hook grab for entering the body of the pickle or other articles and firmly grasping and holding the same in withdrawal from the bottle or receptacle; to construct a pickle fork from wire formed into shape to have a twisted stem, a spear point and a hook grab all integral with the other; and to construct a pickle fork from a single piece of wire, formed into shape to have a twisted stem, a spear point and a spiral hook grab, all integral one with the other.

The invention consists in the features of construction hereinafter described and pointed out in the claim.

In the drawings, illustrating the invention, Figure 1 is an elevation of the fork complete; Fig. 2, a detail showing the acting end of the fork latterally, viewed from Fig. 1; and Fig. 3, an end view of the acting end of the fork.

The fork in the construction shown is made from a single piece of wire of the length required to be turned on itself and form the stem, the spear point and the hook grab of the completed fork. The two parts or strands of the wire are twisted together to produce a single twisted strand, which forms the stem $a$ of the fork. The unjoined or free ends of the two parts or strands of the wire turned on itself are made into a spear point $b$, and the hook grab $c$ which preferably is of a spiral or corkscrew shape, so as to have an outward curve away from and toward the spear point, with a space between the terminal end of the hook grab and the spear point as shown in the drawing. The spear point $b$ and the hook grab $c$ are both made sufficiently sharp so as to readily enter the body of the pickle or other article, and when entered have the article grasped and held firmly by and on the acting end of the fork. The joined or continuous end of the parts or strands at the non-acting end, in the form shown, are curved so as to furnish a finger loop $d$, to facilitate handling the fork in use.

In use the fork is inserted in the mouth or neck of the bottle or receptacle and the spear point $b$ made to enter the body of the pickle; and when entered the spear point $b$ furnishes a pivot on which the fork can be turned and in turning cause the hook grab $c$ to enter or engage the body of the pickle outside of the spear point for the spear point and hook grab to firmly bite or grasp the pickle and hold the same against falling off in withdrawing the pickle from the bottle or receptacle. After the pickle has been fully withdrawn a reverse turn of the fork will disengage the hook grab from the pickle, permitting the fork to be readily removed.

The device is very simple but furnishes a fork specially adapted for removing pickles, olives, and other articles from bottles or receptacles; and such removal is not attended with any difficulty and inconvenience as the fork, at its acting end, can be inserted into and engaged with the body of the pickle for removing the pickle and can be easily and quickly disengaged whenever the pickle has been removed. While it is preferred to make the fork form a single piece of wire turned on itself, it could be made from two pieces twisted together to form the stem and shaped at the acting end to furnish a spear point and a hook grab; and instead of wire a metal strip or strips could be utilized and formed into shape to have a stem and an acting end with a spear point and a hook grab.

What I claim as new and desire to secure by Letters-Patent is

1. A pickle fork, consisting of a stem, formed by twisting together two strips or strands of metal, and an acting end having a spear point at the terminal end of one strip or strand and an outwardly curved hook grab at the terminal end of the other strip or strand, for the acting end to enter and grasp the body of the pickle, substantially as described.

2. A pickle fork made from a single piece of wire turned on itself to furnish two strands and having the two strands twisted together to form a stem and having the free end of one strand shaped to form a spear point and having the free end of the other strand shaped to form an outwardly curved hook grab, the spear point and hook grab constituting an acting end for entering and grasping the body of the pickle, substantially as described.

3. A pickle fork made from a single piece of wire turned on itself to furnish two strands and having the two strands twisted together to form a stem and having the free end of one strand shaped to form a spear point and having the free end of the other strand shaped to form an outwardly and spirally curved hook grab, the spear point and the hook grab constituting an acting end for entering and grasping the body of a pickle, substantially as described.

4. A pickle fork, consisting of a stem and an acting end, the acting end having a spear point and an outwardly and spirally curved hook grab for entering and grasping the body of the pickle, substantially as described.

EDWARD F. MENKIN.

Witnesses:
 WILLIAM P. BOND,
 OSCAR W. BOND.